(12) United States Patent
Pardikes

(10) Patent No.: US 6,207,719 B1
(45) Date of Patent: Mar. 27, 2001

(54) METHOD AND SYSTEM FOR PREPARING ASA EMULSION

(76) Inventor: Dennis G. Pardikes, 12811 S. 82nd St., Palos Park, IL (US) 60464

( * ) Notice: Subject to any disclaimer, the term of this patent is extended or adjusted under 35 U.S.C. 154(b) by 0 days.

(21) Appl. No.: 09/136,677

(22) Filed: Aug. 19, 1998

(51) Int. Cl.⁷ .............................. B01F 5/06; B01F 15/02; B01F 17/52
(52) U.S. Cl. ...................... 516/67; 162/168.1; 366/136; 366/176.1; 366/340; 516/76; 516/924
(58) Field of Search ................ 516/67, 76, 924; 366/132, 134, 136, 176.1, 176.2, 340; 162/168.1

(56) References Cited

U.S. PATENT DOCUMENTS

| | | | |
|---|---|---|---|
| 2,516,884 | * 8/1950 | Kyame | 366/136 X |
| 3,582,048 | * 6/1971 | Sarem | 366/340 |
| 4,057,223 | * 11/1977 | Rosenberger | 366/176.1 X |
| 4,274,749 | * 6/1981 | Lake et al. | 366/132 |
| 5,219,912 | * 6/1993 | Takahashi et al. | 162/168.1 X |
| 5,653,915 | * 8/1997 | Pardikes | 516/67 |
| 5,730,937 | * 3/1998 | Pardikes | 422/62 |

FOREIGN PATENT DOCUMENTS

| | | | |
|---|---|---|---|
| 0 151 994 | * 8/1985 | (EP) | 162/168.1 |
| WO82/03797 | * 11/1982 | (WO) | 366/136 |

* cited by examiner

Primary Examiner—Richard D. Lovering
(74) Attorney, Agent, or Firm—Laff, Whitesel & Saret, Ltd.; J. Warren Whitesel

(57) ABSTRACT

A continuous output system makes paper coating by combining an emulsifier with ASA particles having sizes in the low to sub-micron region. A turbine, pump, blender or other device exposes the ASA to a number of repeated episodes of high shear until the resulting ASA is in the form of particles having a mean average diameter in approximately the $1\mu$ range. A manifold provides the system piping in order to minimize the internal areas where ASA may build up. This manifold has a plurality of holes bored in a solid metal block so that each of the bores forms a short pipe which is only an inch or two in length in order to reduce the interior surface area of an ASA transport and conveyance system.

28 Claims, 4 Drawing Sheets

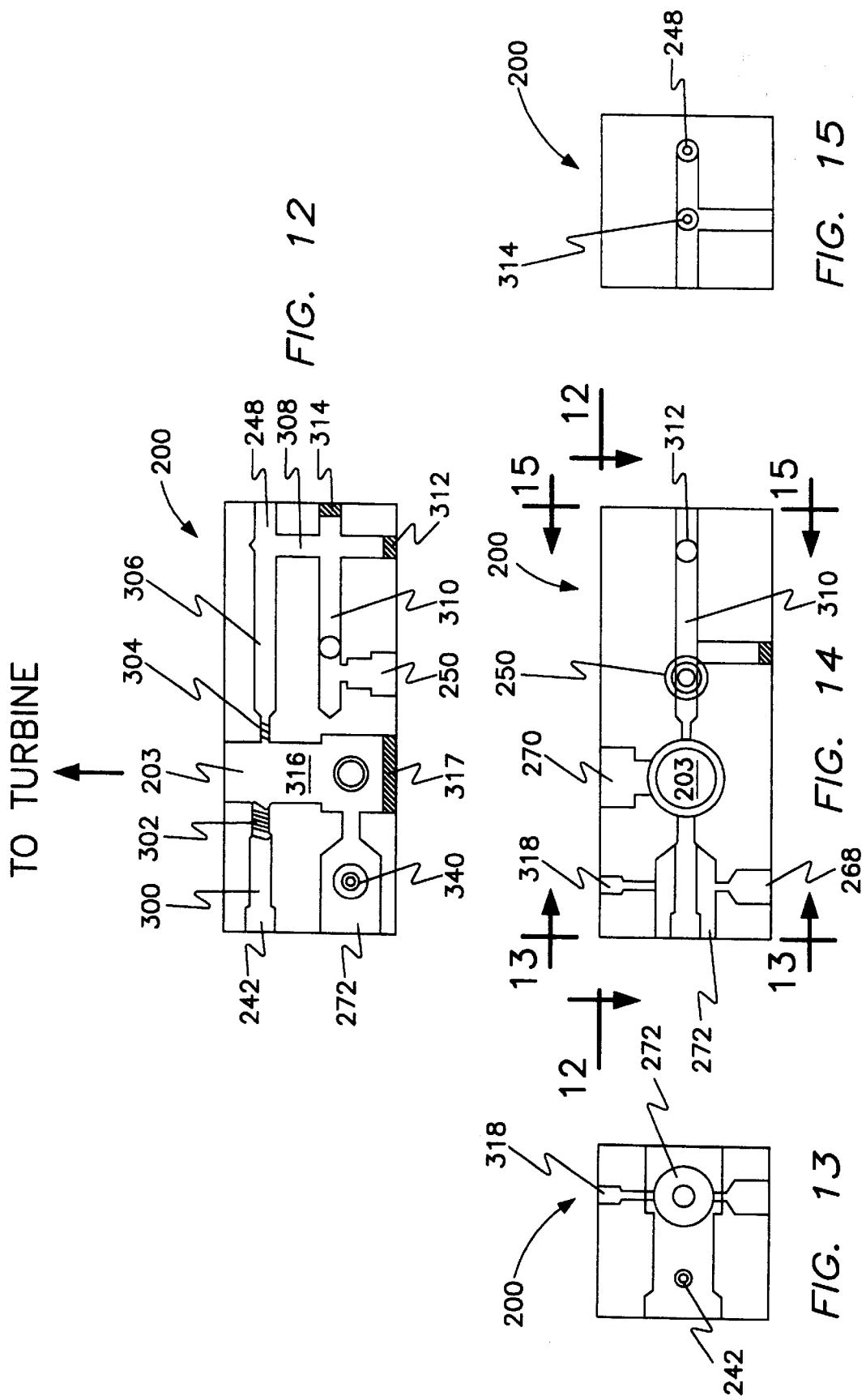

METHOD AND SYSTEM FOR PREPARING ASA EMULSION

This invention relates to means for and methods of apply an ASA sizing or coating to paper and more particularly a system having means for preventing a build up of ASA on inside surfaces of apparatus that is used to produce the sizing.

Reference is made to my U.S. Pat. 5,653,915 for more information on ASA coating systems. As good as it is, this system, like most paper coating systems, suffers from a build-up of ASA on inside surfaces of pipes, nozzles, valves, and other parts of the system. This build-up generally required a periodic back flushing and clean out every 2–4 months. With the invention, this periodic period can be increased many fold.

This build-up occurs because, when it is added to pulp stock during a paper making process, a hydrocarbon based ASA polymer material forms a protective barrier, resists moisture intrusion into the paper, and provides a conditioned surface for the application of inks to paper. Those same characteristics tend to form a similar barrier on the inside surfaces of the system pipes, valves, nozzles, etc.

Accordingly, a desired feature of the invention is to reduce the area of the inside surface, and in particular, to eliminate minute spaces where the build-up quickly forms and decreases the quality of the emulsion produced by the system. One such minute space is the atomizing nozzle which reduces the ASA to a spray of fine particles which may be thought of as tiny droplets of oil suspended in a liquid, such as water, for example. Heretofore, these particles have been formed by atomization, but the atomizer nozzles have tended to be clogged by the ASA. Another concern is the large amount of surface not presented by the plurality of inter-connecting piping in contact with the ASA emulsion during the processing.

The quality of the ASA coating is largely dependent on the particle size of the colloidal droplets. Particle counters, particle size analyzers, and microscopes are available to estimate the particle size. While these tools are effective, they are also tedious and more importantly, intermittent, so that there is no continuous monitoring of particle size during the production thereof. Heretofore, samples had to be drawn from an emulsification unit and analyzed in a laboratory in order to determine particle size. With such an intermittent testing, any changes in the quality of the emulsion on-line would not be detected in time to prevent at least some poor sizing performance on the paper machines. My U.S. Pat. 5,730,937 describes a monitor and sensor which is able to continuously monitor a flowing stream for particle size and concentration, and to send control signals in response thereto.

ASA emulsions are stabilized either by cationic starches (a natural polymer) or by proprietary synthetic polymers. From the viewpoint of someone practicing this invention, the customer usually prescribes not only the surfactant to use along with an identification of the polymer to be processed, but also supplies a blend with the surfactant already in the ASA. Regardless of whether a cationic starch or a synthetic polymer is used, an additional surfactant has been required in the emulsification step. The surfactant provides a boundary layer resistance to shear for the ASA particles. This surfactant is normally a non-ionic alkyl phenol ethoxylate. The composition of most surfactants is a trade secret which is closely held by the manufacturer, causing an increased uncertainty which makes the design of a general purpose system more difficult. Since the user of my system must accept and process the prescribed blends, it must be versatile enough to work with virtually all blends.

Putting these thoughts together, a system has to impart enough energy to a blend of ASA emulsifier and surfactant to break it into very fine particles. My above identified patent supplies the energy by a combination of a nozzle, subject to clogging, and a high speed pump. To eliminate the nozzle, another form of device must be provided to impart the energy. If, in the process of imparting such energy, a substantial cost savings can be realized, the system is even better. Since the nozzle and high speed pump were among the more costly parts of my earlier system, improvements of the described type are highly desired.

In keeping with an aspect of the invention, the system uses any of various mechanically means to break-up the blend of ASA and surfactant into fine particles. These means involve devices such as turbines, blender and the like. The invention solves the problem of reducing the internal surface area of the system by drilling holes in a block of metal so that the bores of the holes perform the functions of pipes. The longest of those bores is only a few inches. I have reduced the costs of the system by a factor of 40–50% as compared to the cost of prior art systems. Also, I have formed ways of making systems having a capacity in a range from very small to very large with only a small amount of system modification.

The term particle "size" refers to the average mean diameter/volume of the particles. Of course, the actual size of the particles will be distributed in a manner described by the well known Gaussian or bell shaped curve Therefore, some particles will be larger and some smaller than the average cited in this specification.

The success of the sizing is directly related to the quality of the emulsion (ASA particle size). A high level of size retention is mandatory in any ASA sizing system. If the ASA colloidal particle size is not small enough, there is a less stable emulsion and a lower retention of the size. A high retention means less re-circulation of ASA in a white water system and fewer problems associated with hydrolyzed ASA which forms a gum like particle called a "stickie". One of the reasons why smaller particle size is so important is that it does less damage to paper making machines which tend to gum-up, if the particle size is too large.

The conflict for the system designer is to make the particles as small as possible without breaking the molecules of the starch and causing the ASA to react with water. In general, the smaller the particles, the better, a useful average mean diameter range being about 0.1 micron–3.0 micron; with a range of about 0.5 micron–1.5 micron preferred.

Because the internal phase is made up of the ASA, the emulsion is classified as an oil in water ("O/W") emulsion. The two most common natural polymer emulsifiers (external phase) are corn and potato starch which are chemically modified to enhance their cationic charge characteristics. Another approach utilizes synthetic polymers in lieu of starch. The starch or polymer surrounds and protects the ASA thus encapsulating the ASA to keep it from hydrolyzing. In effect, the starch is the protective barrier for the particles of oil (ASA) to be spread on the paper. The "oil" is an internal coating which makes the paper water resistant and receptive to ink.

One consideration which goes into the design of my system involves a calculation of how much energy is required to produce the ASA particles having a desired particle size. In an exemplary mill application, the ASA and starch (or other suitable emulsifier) are metered through an emulsification unit designed to impart energy to the mixture to create a suitable and stable emulsion. The emulsion is then metered onto the paper. There the ASA emulsion combines with the furnish.

I have found that I can produce superior results with a mixing head costing under $1,000 and using standard commercial items, such as those shown in FIGS. 5–10. For example, a turbine that is useful with the invention may be almost any of those manufactured by MTH PUMPS of 401 West Main Street, Piano, Ill. 60545, although one of their turbines may be preferred over other of their turbines for any given installation. To this mixing head, there must also be added the cost of controls, sensors, and the like. However, the cost for controlling these standard commercial products is generally less than the controls which must be designed for special equipment. I have found that in order to achieve a proper particle size with a good distribution, two things should happen. First, a proper number of shearing events should occur in an order of magnitude of at least about 150,000 shear events per minute. Second, the blade tip speed should be at least about 5000 feet per minute.

In order to quantify the number of shearing events for the emulsion, reference may be had to the following equations:

$$\frac{\text{(Number of Shearing Events/Minute)}}{1,000,000} \quad (1)$$
$$\text{(Velocity of Blade Tip Ft/Min)}$$
$$\text{(Duration of Contact Time Minutes)}$$

From the information published for various standard commercially available machines and by using Equation 1, the following table can be calculated:

TABLE 1

|  | Energy Factor |
| --- | --- |
| Standard Centrifugal Pump | 79 |
| Standard Turbine Pump | 361 |
| Laboratory Blender | 752 |
| High Speed Centrifugal | 138 |
| High Speed Turbine | 1020 |
| High Speed Stack Centrifugal Pump | 620 |

The "Energy Factor" is a dimensionless index which gives an indication of the efficiency of the various mixing machines. Table 1 shows that the standard centrifugal pump, the standard turbine pump, and the high speed centrifugal pump are not very good. The remainder of these mixing machines have an "energy factor" index in the range of 620–1020 which makes them acceptable. Depending on the choice of blade or impeller design and on the fixed rotational speed, the only variable that comes into play is the duration of the contact time between the blade and the ASA. The maximum contact should not exceed 3 minutes. Any number below this value is acceptable if it satisfies the required particle size. However, for most uses, with one exception, the optimal time has been found to be approximately one minute of contact time. The only exception found to date is the laboratory blender. Due to its combination of small blades and high rotational speed, about twenty seconds is usually adequate. If the duration of the contact time in the blender is in excess of one minute, there can be a latent heat buildup in the emulsion.

Using a preferred range of one minute of contact time, we can compare the prior art to the invention, as follows:

Prior Art

Standard turbine with a 29-blade, four inch impeller, turning at 3450 RPM. To calculate the blade tip velocity (V) in Ft/Min $$V = \frac{2\pi r(\text{RPM})}{12} \quad (2)$$

where r = radius of impeller $$V = \frac{2(3.14)(2)(3450)}{12} = 3611 \text{ ft/min}$$

To Calculate Shear Events/min:

(Number of blades)×(number of impellers)×(Rev. per minute)

$$29 \times 1 \times 3450 = 100{,}050 \quad (3)$$

To Determine the Energy Factor:

$$\frac{\text{(Shearing events/min) (V) (duration of contact in min)}}{1,000,000} \quad (4)$$

$$\frac{(100050)(3611)(1)}{1000000} = 361$$

According to the teaching of the invention over the prior art, we now see that:

High speed turbine at 5800 RPM with a 29-bladed impeller of 4" diameter $$V = \frac{2(3.14)(2)(5800)}{12} = 6070$$

Shear Events/Min (Number of blades) (number of impellers) (Revs per minute)

$$(29)\,(1)\,(5800) = 168200 \text{ shear events/min} \quad (5)$$

Energy Factor $$\frac{\text{(Shear Events/Min) (V) (Duration of Contact in Minutes)}}{1000000} \quad (6)$$

This example shows that the energy factor has increased (361 vs. 1021) substantially over the prior art for the same duration of the emulsion contact time. This 2.8 times increase $$\frac{1021}{361} = 2.8$$

improves the efficiency of the emulsification unit, resulting in improved particle size and distribution.

Calculations

To calculate blade tip velocity $$V = \frac{2\pi r \times \text{RPM}}{12} \quad (7)$$

where:
 r=radius of shearing blade or impeller in inches
 RPM=speed of blade in revolutions/minute
 V=Velocity expressed as ft/minute To Calculate Shearing Events/Minute $$B \times N \times RPM = SPM \quad (8)$$

where:
B=number of blades
N=number of stacks or impellers
RPM=revolutions/min
SPM=shearing events/min To Calculate Shearing Factor $$V(t) = SF \quad (9)$$

where:
t=time of exposure to shearing blades in minutes
V=shearing velocity

Examples of Shearing Factor

High Speed Turbine
Diameter of impeller=4-inches
Number of blades=29
Number of stacks=1
RPM =5800
Duration of Exposure time=1 min
From Equation (7):

$$V = \frac{2\pi 2(5800)}{12} = 6070$$

V=6070
SF=6070×1=6070

High Speed Blender
Diameter of impeller=2-inches
Number of blades =4
Number of stacks=1
RPM=33,000
Duration of Exposure Time in Minutes=0.66 min
(From Equation (7))

$$V = \frac{2\pi 1(33,000)}{12} = 17270$$

V=17270
SF=17270×0.33=5699

High Speed Centrifugal
Diameter of impeller=5 inches
Number of blades=5
Number of stacks=1
RPM=4600
Duration of Exposure Time=1 min
From Equation (7)

$$V = \frac{2\pi 2.5 (4600)}{12} = 6018$$

SF=6018×1=6018

Standard Speed Centrifugal
Diameter of impeller=5-inches
Number of blades=5
Number of stacks=1
RPM=3450

From Equation (7)

$$V = \frac{2\pi 2.5(3450)}{12} = 4513$$

CALCULATION FOR 160-BLADE TURBINE

Shear events per minute:
(Number of Blades 160) (Number of impellers 1) (Revs per Minute 5800)
(160) (1) (5800) = 928,000 shear events per minute
In the next step, calculating the energy factor, substituting 928,000 SPM for 168,200 SPM in Equation 5 yields:
(Shear Events/Min 928,000) (V6070) (Duration of Contact in Minutes 1)

$$\frac{(928,000) \ (6070) \ (1)}{1,000,000} = 5632 \ \text{Energy Factor}$$

TABLE 2

| RPM | | Blade Tip Speed | Duration in Minutes of Contact Time |
|---|---|---|---|
| 3450 | Centrifugal | 4513 | 1 |
| 3450 | Turbine | 3611 | 1 |
| 33,000 | Blender | 17270 | .33 |
| 4600 | H.S. Centrifugal | 6018 | 1 |
| 5800 | High Speed Turbine | 6070 | 1 |

While the mechanism of particle size retention is not fully understood, it is thought that once established, a very small particle size tends to form a better distribution in the emulsion. However, it also seems that, after the small particles are formed, and if they do not have time to stabilize some of them may attract each other so that they come together again, thus clumping and reforming into big particles. These bigger particles can adversely affect the mechanical properties of the coating.

BRIEF DESCRIPTION OF DRAWINGS

A preferred embodiment of the invention is shown in the attached drawings, in which:

FIGS. 12–15 are four views of an inventive manifold block for replacing the ASA/polymer transportation and delivery system of FIG. 11, FIG. 12 being a top plan view, FIG. 13 being at left, elevation view, FIG. 14 being a front elevation view, and FIG. 15 being a right end elevation view.

The invention uses a mixing manifold block to reduce the inside surface area of the delivery and transport system which conveys the ASA. An early form of a mixing manifold is shown in FIGS. 1–4 taken from my U.S. Pat. No. 5,372,421.

Figure 1:
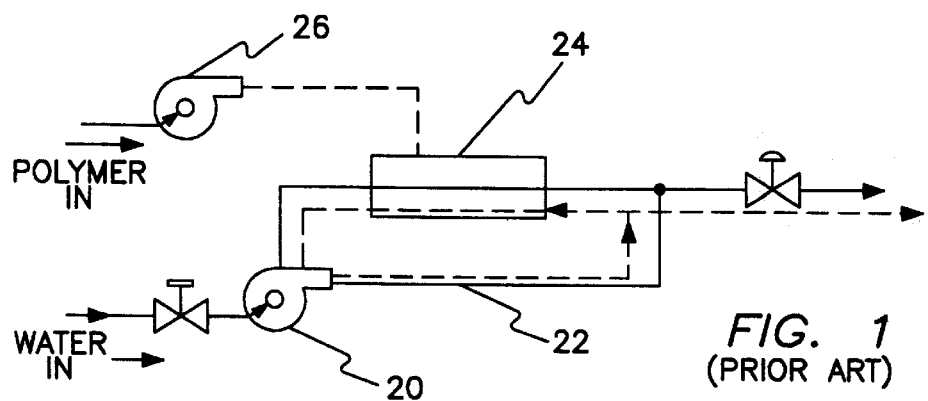
FIG. 1 is a block diagram of my relatively simple prior art system for activating or inverting polymer.
Figure 2:
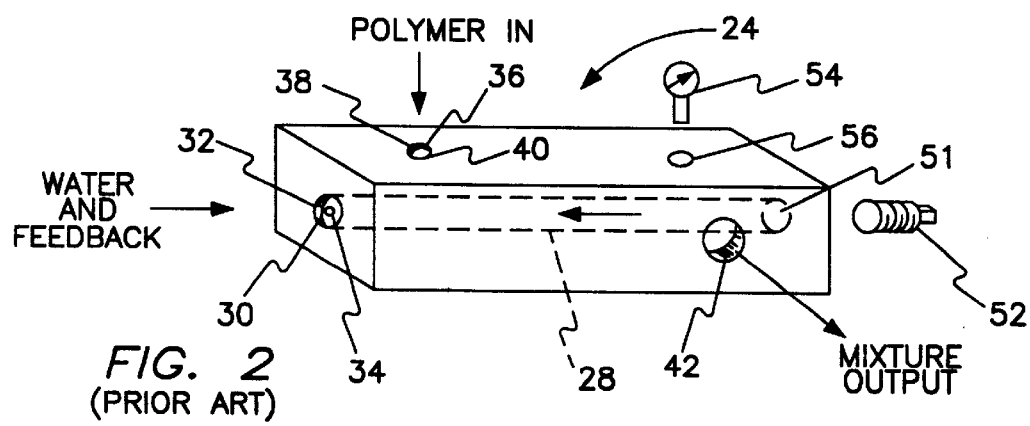
FIG. 2 is a manifold block for use in the system of FIG. 1.
Figure 3:
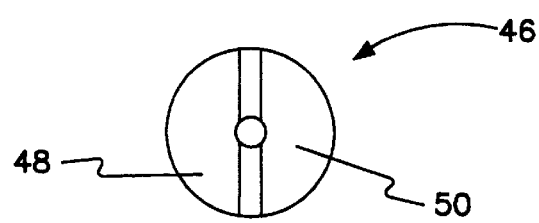
FIGS. 3–4 are two views of a static mixer comprising an end view, and a side elevation.
Figure 4:
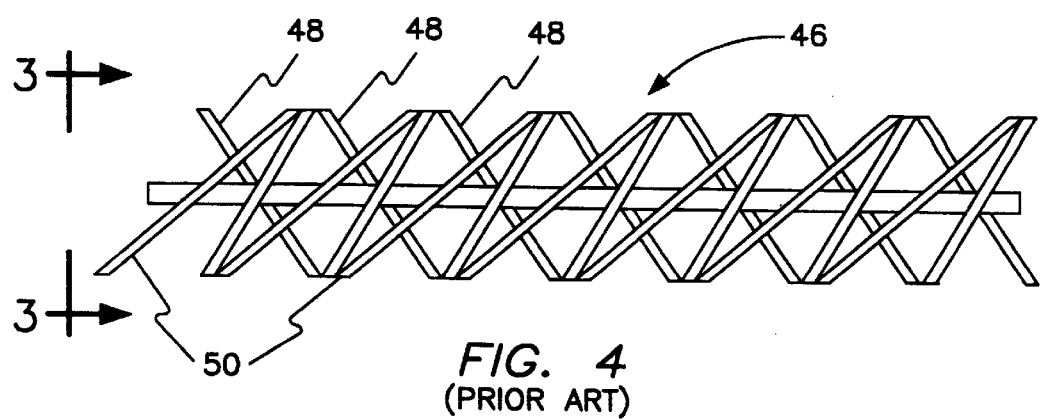

In FIG. 1, the polymer inverting and activating system components are a centrifugal pump 20 for introducing water, a closed mixing loop 22, mixing manifold 24, and a centrifugal pump 26 for introducing the polymer in to the manifold. The water and polymer first meet in the mixing manifold 24, the water flow being indicated in FIG. 1 by solid lines and the polymer flow being indicated by dashed lines.

In greater detail, the mixing manifold 24 (FIG. 2) is, for example, a solid block of metal having a central bore 28 extending through substantially its entire length. The bore stops short of counter bored and threaded input opening 30, to form a bulkhead 32. An orifice 34 of a selected diameter is formed in the center of the bulkhead 32 to establish communication between the water inlet hole 30 and the central bore 28, with a flow rate that is controlled by the orifice diameter. The polymer solution experiences an extrusion type of shear as it passes through the orifice 34.

A first threaded hole 36 leads to another bulk head 38 between the entrance to the counter bored and hole 36, and the central bore 28. An orifice 40 is formed in the bulkhead 38 to establish communication and to control the flow rate between the hole 36 and the central bore 28.

The output port 42 is in direct communication with the central bore 28 to give an unimpeded outflow comprising a mixture of polymer and water.

A static mixer 46 (FIGS. 3 & 4) comprises two sets of semi-elliptical baffles which are set at an angle with respect to each other so that the over all end view configuration is a circle (FIG. 3) which corresponds to the inside diameter of the central bore 28. Therefore, the static mixer 46 slides through an end opening 51 and into the bore 28. The baffles 48 on one side of the static mixer are a series of spaced parallel plates. The baffles 50 on the other side of the static mixer are joined on alternate ends to give an overall zigzag appearance. A plug 52 seals off the end of the bore. A gage shown at 54 fits into a hole 56 that is in communication with bore 28.

An inspection of my ASA U.S. Pat. No. 5,653,915 reveals a manifold having a nozzle at the ASA inlet. This is the relatively expensive atomizing nozzle which, like most nozzles for ASA, is subject to clogging after a relatively short period of use. An elimination of this nozzle both simplifies the system, reduces the cost thereof, and eliminates a source of relatively early clogging. However, before eliminating the nozzle, some other means is required for imparting enough energy to break the ASA into tiny particles. For a description of such means for imparting energy, reference may be made to FIGS. 5–10. as examples of various means for reducing ASA to the particle size.

Figure 5:
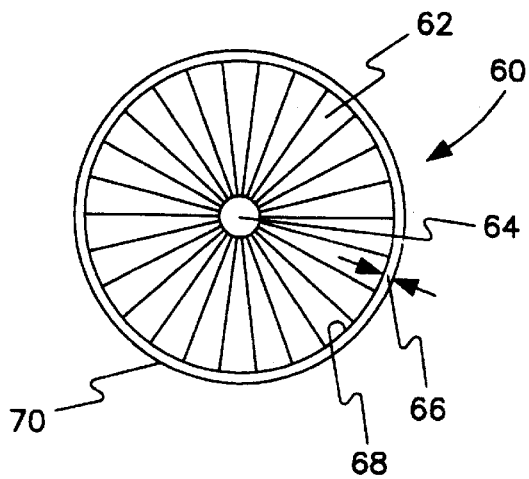
FIG. 5 is a plan view showing the front of a turbine for imparting energy to the ASA.

FIG. 5 shows the front of a turbine 60 having a multiblade rotor 62 turning about a shaft 64 in a housing 70. The ASA passes from one side of the turbine through the blades and out the other side. The collisions between the ASA and the blades are the shear events which form the particles. There is an extremely small clearance 66 between the tips 68 of the turbine blades and the surrounding housing 70 so that very little of the ASA which has passed through the blades feeds back to the input side of the turbine.

Figure 6:
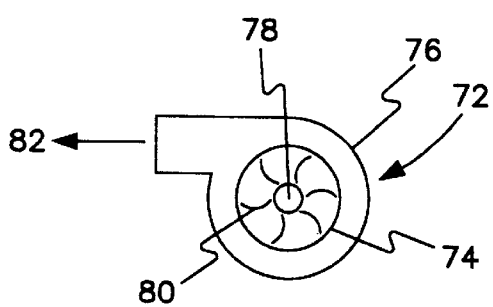
FIG. 6 is a schematic view of a pump impeller for imparting energy to the ASA.

FIG. 6 schematically shows a pump 72 having an impeller 74 mounted to rotate within a housing 76. The ASA material which is to be broken into particles falls into an eye 78 of the impeller from which it is flung out by centrifugal force. All of the ASA will be struck by the blades 80. Much of the ASA will strike the housing 76. A good portion of the ASA will feed back into the blades and be struck repeatedly. Each of these encounters imparts some shear and breaks the particle in order to reduce their size. A portion of the ASA will leave the housing at 82.

Figure 7:
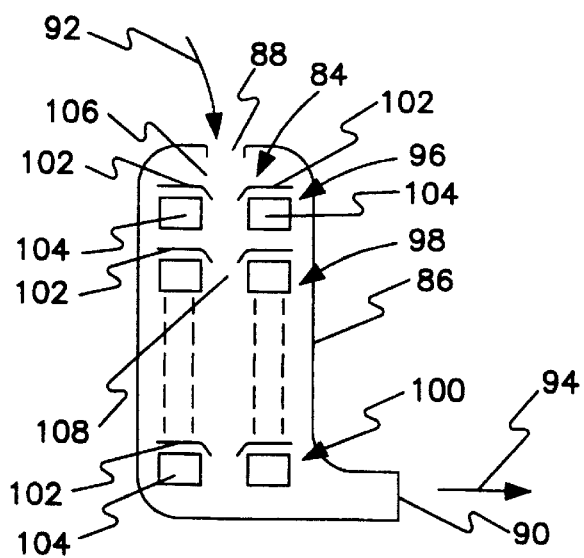
FIG. 7 is a schematic view of a vertical stack centrifugal pump.

FIG. 7 schematically shows a stack 84 of centrifugal impellers which are enclosed within a common housing 86, which are mounted to turn on a common shaft. The housing has in inlet 88 and an outlet 90 for ASA to enter, at 92 and leave at 94. Inside the housing, there are any suitable number of impellers. 96–100 mounted to turn as a unit. Each impeller has a scroll plate 102 which turns with its individually associated blade 104.

As the ASA 92 enters the housing inlet at 88, it encounters and passes through an eye 106 in the scroll plate 102. The rotation of the impeller causes the ASA to emerge from stage 96 with a certain pressure. The design of the successive impeller stages 96, 98 . . . 100 is such that the pressure at the eye of the next successive eye (such as 108) sucks the ASA from the preceding stage. Thus, the ASA 92 enters eye 106 on the scroll plate 102 of stage 96, passes through the impeller blades 104 and is sucked into eye 108 on the scroll plate of the next succeeding stage 98.

In a similar manner, the ASA passes from stage to stage until it reaches the last stage 100 where the centrifugal force of the impeller flings the processed ASA 94 out the exit 90.

Figure 8:
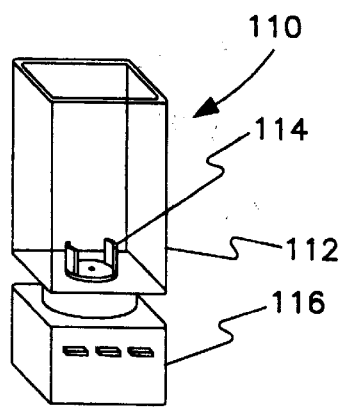
FIG. 8 is a schematic view of a blender for imparting energy to the ASA.

FIG. 8 schematically shows a blender 110 having a container 112 for receiving the ASA. In the bottom of the container, a number of blades 114 are mounted for rotary motion, driven from a motor in the base 116.

I have found that blenders work very well, although not as well as turbines. A blender, for example, has almost nothing to separate the material that has and the material that has not experienced shear.

Stated another way, a turbine with only a very little feedback which produces, say, 10,000 opportunities for shear during a given time period is not completely matched by a blender which produces the same 10,000 opportunities. However, the blender produces particles that are almost as good as the particles produces by a turbine. The "energy factor" index (752) for a blender is better than the index (620) for the high speed stack centrifugal pump where the feedback is reduced. It is also true that the high speed turbine with small clearance and little feedback has an "energy factor: index of 1020, which is better than the factor the blender; however, there is as much reason to believe that this may be due to the many turbine blades as it is to believe that it is due to the small clearance. Hence it is clear that the number of shearing events is more important than the prevention of feedback or the other factors thought to be important by the prior art. Because it has mechanical limitation, the blender is best when limited to a use within a laboratory environment. There are trade offs considering the low cost of the blender, the size of the system and a possibly short life time for the blender.

Figure 9:
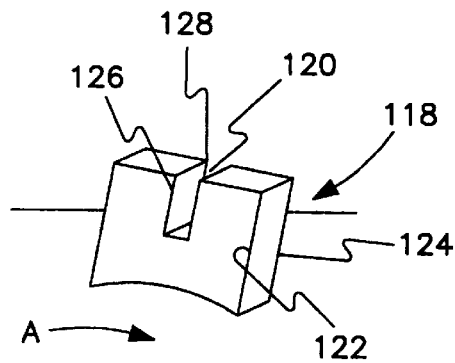
FIGS. 9 and 10 are two schematic views showing ways of modifying blades for increasing the opportunity for ASA to encounter shear events.
Figure 10:
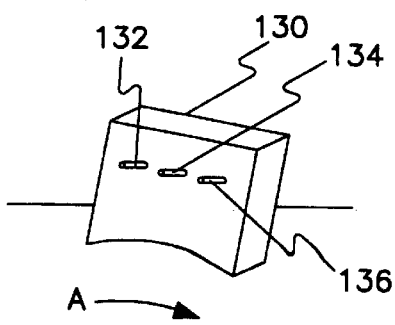

FIGS. 9 and 10 are examples of how the blades of any of these devices may be modified to create more shear events without increasing either the speed of rotation or the number of blades. For example, in FIG. 9, the blade 118 has a notch 120 cut into it so that, if rotating in direction A, the number of sharp edges (122–128) striking the ASA has been doubled over the number of edges by a blade without a notch. In FIG. 10, the blade 130 has three pegs 132, 134, 136 projecting from each side. As the blade rotates, each of these pegs strikes the ASA to add shearing events. Of course, these two examples are given merely to illustrate a principle. Many different modifications of the blades are possible.

Figure 11:
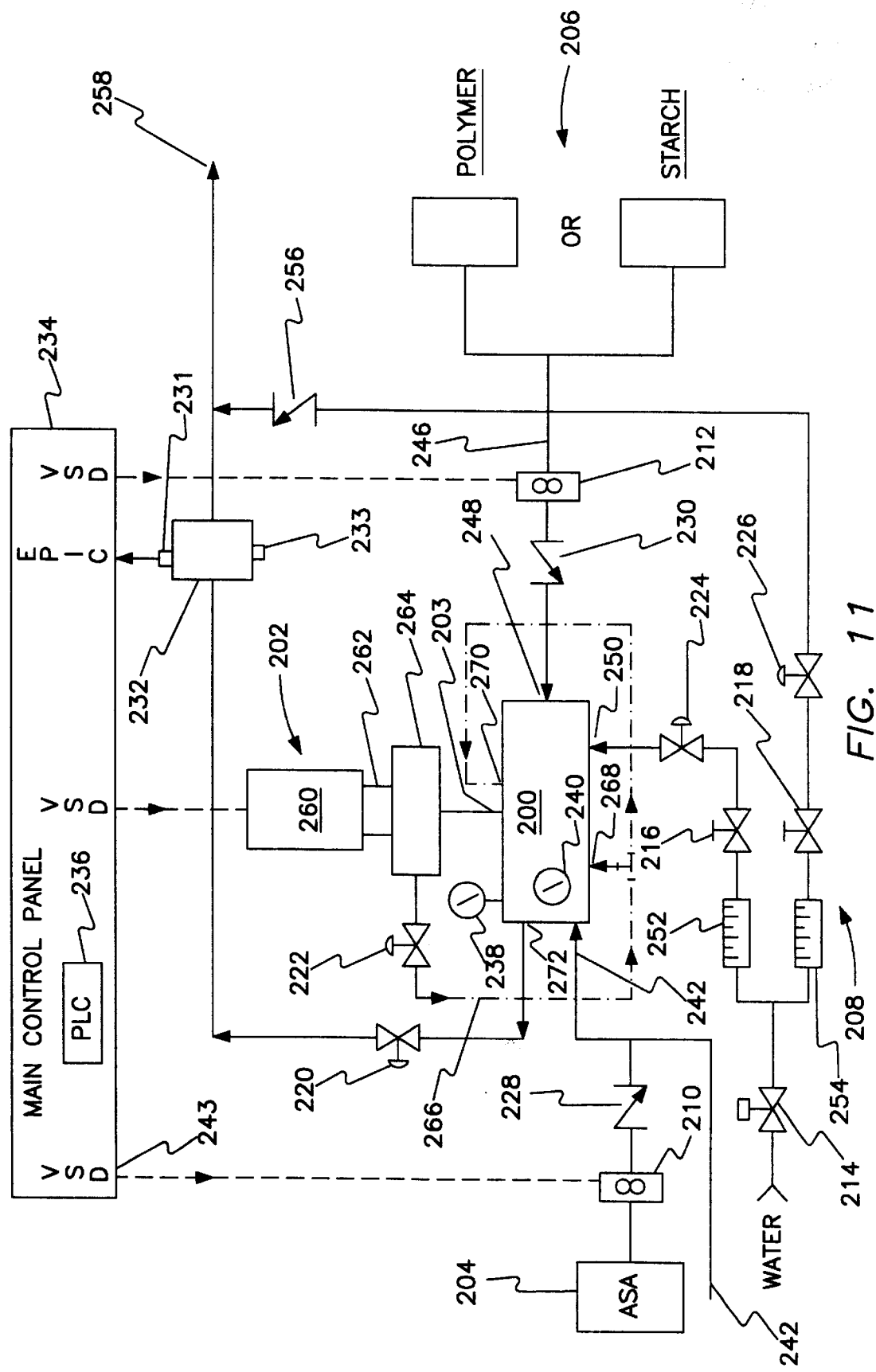
FIG. 11 is a schematic diagram of the inventive system.

The inventive system is schematically shown in FIG. 11 which uses the principles described above. The principal parts are a manifold 200, a turbine 202, a source of ASA 204, a source of polymer 206 (either starch or synthetic), flow meters 208, gear pumps 210, 212, throttle valves, as 214, 216, 218, pressure controllers 220, 222, flow controllers, 224, 226, check valves 228, 230 an EPIC sensor and monitor system 232, and a control panel 234 including a microprocessor 236. Pressure gages are shown at 238, 240.

The inventive system (FIG. 11) has a suitable tank 204 which stores the ASA, usually pre-blended with a surfactant in the range of 0.5–4% by weight of the total blend. If desired, the tank 204 may include only ASA, while the surfactant is separately introduced at 242. A suitable gear pump 210 delivers the mixture through a suitable strainer, such as a 100-mesh strainer. Pump 210 provides a positive head in the range of 10–60 psi, which flows through check valve 228 to input 242 on manifold 200. A pressure gage 240 gives a continuous reading of the ASA pressure in the manifold 200.

The speed of pump 210 is controlled by a programmable logic circuit 236, preferably in the form of a microprocessor, via a variable speed terminal 243. The output of pump 210 may be in the range of 100–200 psi with 40–60 psi preferred. A check valve 228 passes the ASA in the direction of the arrow (i.e. toward the manifold 200) and prevents a back flow from the starch/polymer line which would contaminate the pristine ASA mixture.

The starch/polymer is transmitted under the pressure of pump 212 from any suitable source 206 via a line 246 and check valve 230 to manifold input 248. The starch/polymer pump 212 delivers the starch/polymer at a rate in the order of 0–10 gpm, for most systems. Obviously, a different volume may be used in other systems.

An electrolyte, here in a form of water, is introduced into the manifold via throttle valve 214 and flow meters 208, a primary dilution water path may be traced through throttle valve 216, and flow regulator 224, to manifold inlet 250. This primary dilution brings the ASA and starch/polymer to a desired consistency. A secondary dilution electrolyte path is traced through flow meter 254, throttle valve 218, flow regulator 226 and check valve 256 to the output 258. The secondary dilution path provides enough water to fine tune and brings the final output to a desired consistency.

As here shown, turbine 202 includes a motor 260 coupled through a shaft 262 to a turbine 264 constructed as shown in FIG. 5. Depending upon the needs of the system, any of the devices of FIGS. 5–10 may be used. The ASA/polymer/water mixture enters the manifold 200 at entrance 203. The turbine 264 imparts enough energy to break the ASA into tiny particles of a desires size with a recycle out flow over a path 266 shown by a dot-dashed line. Recycle is controlled by flow regulator 222. The recycle out flow divides, part going back into the manifold at 268 and part at 240.

A relatively small percentage of the mixture exits the manifold 200 at outlet 272 and travels through flow regulator 220 and sensor 232 to the system output at 258.

Control means are provided for enabling a continuous testing of particles during a production run. Primarily, the prior art used non-continuous sampling as their only available means to verify the quality of the emulsion. At monitor and sensor 232, the inventive system provides the EPIC (Enhanced Polymer Imaging Controller) of U.S. Pat. No. 5,323,017 to continuously monitor the quality of the emulsion. Briefly, this patent discloses a source of preferably laser light shining through a flowing output stream of an ASA emulsion. The light from source 233 is sensed at 231 and a signal is sent to control panel 234 in response thereto. Hence, the EPIC controller uses a laser to apply a combination of light scatter and absorption principles to establish a spatial distribution of ASA and polymer composites which accurately corresponds to particle size and particle concentration. This sensor detects instantaneous changes in the ASA particle size concentration, which can be displayed (not shown) at a main control panel 234. This sensor is manufactured by Norchem Industries of Tinley Park, Ill.

Because the sensor 232 scans the emulsion with coherent (laser) light and monitor only selective wavelength it can be fined tuned to look for particles within a specific refractive index in an extremely narrow bandwidth (5–20 nm). Also, because the refractive index of a substance which is varied for different wavelengths, conventional light scattering instruments are not always as reliable. Unlike turbiditmeters or nephelometers which use a white light (thermal radiation source), the laser eliminates all refractive index differences for all the wavelengths except those emanating from the source. All that remains to affect the light scatter, is the particle size, shape (distribution) and concentration.

One of the problems is that the buyer of the inventive system does not know in advance exactly what component material will be processed during the lifetime of the system. For example, the starch/polymer may be made from any of many different raw material. There are a number of different ASA's with a great variety of molecular weights or other wide variances. There are thought to be thousands of different surfactants, each with its own particular characteristics. The EPIC controllers helps to over come the resulting problems.

The sensor 232 reads the consistency of the output, primarily the size of the particles. The programmable logic controller (PLC) in the microprocessor responds thereto by adjusting the variable speed drive signals (VSD) sent to pumps 210, 212 and to turbine 202, which brings the system into a finely tuned operation.

The internal construction of the manifold 200 is shown in FIGS. 12–15. In greater detail, FIGS. 12–15 are schematic or graphic presentations showing how the holes are drilled into metal block 200 in order to form the manifold. When viewed from the outside, the metal block 200 appears as having solid sides with only the entrances of the various holes visible. The phantom lines shown within rectangles in FIGS. 12–15 schematically indicate the paths formed by the bores inside the block.

The output of ASA pump 204 is connected to inlet port 242 which is the entrance to a relatively large diameter bore 300 that terminates at its bottom in a bulkhead containing a relatively small diameter hole filled by a plug 302 which has an orifice formed therein. In order to adapt the system to different processing materials and techniques, ASA, surfactants, etc. the plug 302 may be replaced by another plug having a different orifice size.

Any suitable starch/polymer may be inserted into the block 200 via inlet port 248 which communicates with bores 306, 308. Again, a small diameter hole is formed at 310 in the bottom of this bore 306 extending from port 302 contains a plug 304 with a mixture of starch/polymer.

Water is introduced at inlet port 250. A flow control orifice is housed inside of this bore. The ASA, starch/polymer, and water meet at mixing chamber 316. Bore 308 is closed by plugs 312 and 314.

Depending upon the needs of the system, static mixers (FIGS. 3 and 4) may be inserted into either or both of the bores 306 and 310. Then, the end of either of the bores may be closed by plugs, as may be required by specific system needs. For example, the transverse bore 308 is here shown as being plugged at port 312 and bore 310 is shown as being plugged 314. In other embodiments, the plugs may be removed and suitable connections may be made to insert a fluid into these holes.

After the ASA, water, and polymer meet and mix in a central mixing chamber 316, closed by plug 317 the resulting mixture is discharged from the mixing chamber at output port 203, to the inlet of the turbine pump.

The system bleeds off some portion of the emulsion of ASA and starch as a discharge from turbine 264 and another portion is recirculated via a loop shown by the dot-dashed line in FIG. 11. The recycled emulsion reenters manifold 200 via holes 268 and 270 (FIG. 14). This resulting mixture is an emulsion which is discharged from the mixing chamber at output port 272 as the output product of the system.

Any of the various bores which are not used may also be capped by a plug, some plugs having a suitable meter associated therewith. For example, a pressure gage 238, 240 (FIG. 11) may be associated with plugs closing port 318 and 240.

It should now be apparent that most of the pipes used in prior systems have been eliminated and that short bores inside the mixing manifold block 200 have been substituted therefore. Since the adverse effects resulting from a hydrolyzed ASA build-up varies directly with the area of the inside surfaces of passage ways carrying the ASA, the invention sharply reduces the problems growing out of the ASA build up.

Those who are skilled in the art will readily preview how to modify the invention. Therefore, the appended claims are to be construed to cover all equivalent structure which fall within the true cope and spirit of the invention.

The claimed invention is:

1. A method of preparing an alkaline size, alkenyl succinic anhydride ("ASA") in an emulsion, said method comprising the steps of:
   A. supplying a liquid including at least ASA;
   B. feeding a portion of said liquid of step (A) to a first input of a manifold;
   C. feeding a first stream of an emulsifier into a second input to said manifold, said liquid combining with said emulsifier within said manifold to form a first stream comprising a mixture of at least ASA and said emulsifier;
   D. feeding the first stream of step (C) through a mixing means which imparts enough energy to said emulsion to shear and break down said ASA into particles and divide an outflow from said mixing means (i) through a recycling loop to at least a third input of said manifold and (ii) to an output stream of said system, said output stream having a ratio of ASA to emulsifier set by the relative volumes of said streams of Step (B) and Step (C); and
   E. feeding said recycled emulsion of step (D) into said mixing means of step (D).

2. The method of claim 1 wherein said liquid of step (A) includes said ASA and a surfactant.

3. The method of claim 2 wherein said step (D) includes the step of feeding said first stream emulsion through said mixing means while it is operating below a speed and pressure at which the effectiveness of the emulsifier is degraded in response to energy imparted by said mixing means.

4. The method of claim 2 wherein the mixing means of step (D) is selected from a group consisting of: a turbine; a centrifugal pump; a ganged stack of impellers; and a blender.

5. The method of claim 1 wherein the volume in the recycling loop of step (D)(i) is in the range of about 90–95% of the total outflow of said mixing means.

6. The method of claim 1 wherein said mixing mean of step (D) imparts a number of shear events to the emulsion which is sufficient to provide an energy factor index in the range of about 620–1020.

7. The method of claim 1 wherein said manifold is a block of metal having a plurality of holes therein to form bores which provide a network of pipes for transporting and delivering fluids to enable a performing of said steps, thereby minimizing an internal surface area of delivery system for performing said steps.

8. The method of claim 1, wherein said shear is carried out with an energy factor which produces particles in said ASA, said particles having a mean average of about 1 microns.

9. A method of preparing an alkaline size alkenyl succinic anhydride ("ASA") comprising the steps of:
   A. combining an emulsifier and ASA, with a substantial portion of said ASA being formed into particles having a mean average particle size within the range of 0.25–2$\mu$;
   B. diluting the combination of step (A) with a stream of emulsifier;
   C. carrying out said dilution of step (B) with a mixing means that imparts a shear force to said emulsion, said shear force being less than that which reduces the effectiveness of said emulsion by degrading substantial amounts of said emulsifier;
   D. recycling a first portion of a stream flowing out of said mixing means via a feedback loop extending from an output of said mixing means to a means for returning said stream to said mixing means;
   E. directing a second portion said stream flowing out of said mixing means to an output of the system; and
   F. minimizing an internal surface area of a system for carrying out said steps, said system being free of atomizing nozzles.

10. The method of claim 9 wherein the mixing device impart said shear force in step (C) with an energy factor index in the approximate range of 620–1020.

11. The method of claim 9 wherein step (F) is carried out in a manifold formed by holes in a solid block of metal, said holes being inter-connected in order to form a network of pipes within said manifold.

12. A method of processing a paper coating liquid containing at least ASA, said method comprises:
   A. processing said coating liquid in a mixing manifold formed by bores in a solid block of metal;
   B. subjected said ASA while outside said manifold to a high level of opportunities to be exposed to shear, said ASA responding to said shear by breaking into emulsion particles having sizes in the order of 0.5 to 5 microns;

C. forcing said ASA particles of step (B) into a stream containing an emulsifier while inside said manifold;

D. subjecting said stream of step (C) containing said emulsifier and ASA to a primary dilution while in said manifold;

E. recycling a majority of said stream of step (D) to re-experience a repeated exposure to said high level of shear of step (B);

F. sending a minority of said stream containing an emulsifier to a system output after it leaves said exposure to shear of step (B); and G. subjecting said stream containing an emulsifier and ASA to a secondary dilution while on its way to said system output in order to provide a finely turned amount of emulsifier and ASA relative to the total amount of said system output.

13. The method of claim 12 wherein the ASA is blended with a surfactant by the time when it is subjected to said high level of shear in step (B).

14. The method of claim 13 wherein said high level of shear in steps (B) and (E) is imparted with an energy factor index in the order of about 620–1020.

15. The method of claim 12 wherein the exposure to a high level of opportunities to shear occurs in a device selected from a group consisting of: a turbine; a centrifugal pump, a ganged stack of impellers; and a blender having a recycle feedback loop connected between an output of said device and an inlet of said device; the recycling in step (E) of said majority of said stream occurring by diverting a portion of an output stream from said device through said feedback loop to an inlet of said manifold.

16. The method of claim 12 wherein the steps include forcing liquids through at least one orifice within said manifold, said orifice being in a plug which may be replaced in order to change a diameter of said orifice within said manifold.

17. The method of any one of the claims 1, 9, or 12 and control means for enabling a continuous testing of particles during a production run, said control means operating on a detection of a light scatter and absorption.

18. The method of claim 17, wherein said control means comprises a source of light shining through said emulsion and sensor means for detecting light scatter and adsorption of said light after passing through said emulsion.

19. The method of claim 18, wherein said light is a laser light and means which fine tunes said light to detect particles within a specific refractive index.

20. The method of either one of the claims 1, or 12 wherein said shear is carried out with an energy factor which produces particles in said ASA, said particles being in a range of 0.5 to 3 microns.

21. A method of preparing an alkaline sizing comprising the steps of:

a. forming a fluid by mixing an emulsifier and a sizing agent to form a combined stream;

b. diluting the combined fluid of step a with a stream of said emulsifier;

c. applying a shearing force to said fluid during said dilution of step b, with enough shearing events per unit of time to produce a shearing force having an energy factor index which produces particles in a range of about 0.1 to 3 microns;

d. dividing a stream created in step c into two parts;

e. recycling one of said two parts of said stream in order to join the fluid formed in step a; and f. directing the other of said two parts of said stream to an output in order to provide a finished stream.

22. The method of claim 21 wherein said shearing force of step c produces particles having an average particle size within a range of $0.25–2.0\mu$.

23. The method of claim 21 and the added step of initially providing a solid block with a manifold formed therein, and there after carrying out said steps a–f for processing said fluid in said manifold formed within said solid block.

24. A method of breaking a blend of a sizing, emulsifier, and a surfactant into fine particles for coating paper, said method comprising the steps of:

a. selecting a moving mechanical means for imparting shearing events to a fluid during each complete movement;

b. subjecting said blend to said selected mechanical moving means for imparting shearing events to said blend; and c. repeating the shearing events of step b at a rate which provides an energy factor determined by the following parameters applied by said mechanical means; a number of shearing events per unit of time, multiplied by the velocity at which said mechanical means moves per unit of time, and further multiplied by the duration of said unit of time.

25. A system for preparing ASA by processing said ASA within a manifold formed in a solid block of metal having a plurality of holes that are formed therein to provide a plurality of bores that function as a network of pipes to convey liquids; throttle means associated with inputs to said bores; a source of the ASA coupled to a first of said bores via one of said throttle means; means for pressurizing and conveying said ASA at a high pressure through said first bore in said block of metal; means for introducing an electrolyte into a second of said bores via a second of said throttle means; means for introducing an emulsifier into a third of said bores via a third of said throttle means; means within said manifold for combining said pressurized ASA, said emulsifier and said electrolyte within a single stream; means comprising a recycling loop coupled from said manifold through mixing means for imparting an impacting shear and on to a fourth of said bores; a pressure regulating means; and means for taking a system output from a fifth of said bores via said pressure regulating means.

26. A system for preparing ASA by processing said ASA within a manifold formed in a solid block of metal having a plurality of holes that are formed therein to provide a plurality of bores that function as a network of pipes to convey liquids; a source of the ASA coupled to a first of said bores; means for pressurizing and conveying said ASA at a high pressure through said first bore in said block of metal; means for introducing an electrolyte into a second of said bores; means for introducing an emulsifier into a third of said bores; means within said manifold for combining said pressurized ASA, said emulsifier and said electrolyte within a single stream; means comprising a recycling loop coupled from said manifold through said mixing means for imparting an impacting shear and on to a fourth of said bores; and means for taking a system output from a fifth of said bores, and replaceable plug means in at least some of said bores.

27. The system of claim 26, wherein at least one of said plugs contains an orifice so that the diameter of said orifice may be changed by changing said plug.

28. The system of claim 26 further comprising meter means associated with at least one of said plugs for monitoring said process being carried out within said manifold.

* * * * *